(12) United States Patent
Hinderer et al.

(10) Patent No.: US 8,615,464 B2
(45) Date of Patent: Dec. 24, 2013

(54) CREDIT MANAGEMENT SYSTEM AND METHOD

(75) Inventors: Harald Hinderer, Heidelberg (DE); Renato Zadro, Schwetzingen (DE); Robert Doerner, Offenbach (DE)

(73) Assignee: SAP AG, Walldorf (DE)

( * ) Notice: Subject to any disclaimer, the term of this patent is extended or adjusted under 35 U.S.C. 154(b) by 946 days.

(21) Appl. No.: 10/766,863

(22) Filed: Jan. 30, 2004

(65) Prior Publication Data

US 2004/0243510 A1 Dec. 2, 2004

Related U.S. Application Data

(60) Provisional application No. 60/444,310, filed on Jan. 31, 2003.

(51) Int. Cl.
*G06Q 40/00* (2012.01)

(52) U.S. Cl.
USPC ............................................. 705/38; 705/30

(58) Field of Classification Search
USPC ....................................................... 705/10–44
See application file for complete search history.

(56) References Cited

U.S. PATENT DOCUMENTS

| | | | | |
|---|---|---|---|---|
| 5,068,891 A | * | 11/1991 | Marshall | 379/91.02 |
| 5,615,408 A | * | 3/1997 | Johnson et al. | 455/405 |
| 5,732,400 A | | 3/1998 | Mandler et al. | |
| 7,024,386 B1 | * | 4/2006 | Mills et al. | 705/37 |
| 7,231,202 B2 | * | 6/2007 | Natsuno | 455/410 |
| 7,552,086 B1 | * | 6/2009 | Rajasekar et al. | 705/38 |
| 7,571,138 B2 | * | 8/2009 | Miri et al. | 705/38 |
| 7,620,592 B2 | * | 11/2009 | O'Mara et al. | 705/38 |
| 7,797,229 B2 | * | 9/2010 | Doerner | 705/38 |
| 2002/0042763 A1 | * | 4/2002 | Pillay et al. | 705/35 |
| 2002/0116314 A1 | * | 8/2002 | Spencer et al. | 705/37 |
| 2003/0002639 A1 | | 1/2003 | Huie | |
| 2003/0018549 A1 | | 1/2003 | Fei et al. | |
| 2003/0083984 A1 | | 5/2003 | Crawford et al. | |
| 2003/0195840 A1 | | 10/2003 | Xu | |
| 2004/0023637 A1 | | 2/2004 | Johnson et al. | |
| 2004/0153396 A1 | * | 8/2004 | Hinderer | 705/38 |
| 2005/0055296 A1 | | 3/2005 | Hattersley et al. | |
| 2005/0114244 A1 | | 5/2005 | Miri et al. | |
| 2005/0130704 A1 | | 6/2005 | McParland et al. | |
| 2005/0154664 A1 | * | 7/2005 | Guy et al. | 705/35 |
| 2005/0279824 A1 | | 12/2005 | Anderson et al. | |
| 2006/0097036 A1 | | 5/2006 | Koenigsman et al. | |
| 2006/0106691 A1 | | 5/2006 | Sheaffer | |
| 2007/0192242 A1 | * | 8/2007 | Kunz | 705/38 |
| 2011/0078073 A1 | * | 3/2011 | Annappindi | 705/38 |

OTHER PUBLICATIONS

U.S. Appl. No. 10/631,211, "Telecommunications Credit Management System and Method", by H. Hinderer et al., filed Jul. 31, 2003.

(Continued)

*Primary Examiner* — Frantzy Poinvil
(74) *Attorney, Agent, or Firm* — Finnegan, Henderson, Farabow, Garrett & Dunner, L.L.P.

(57) ABSTRACT

Systems and methods are provided for managing credit information relating to customers and the credit process. A credit management system may include a credit information manager, a credit limit manager, credit decision support and a credit rules engine. The credit management system may communicate with external systems, such as external credit information providers, accounting systems, electronic commerce systems and business partners. The credit rules engine may apply rules to information gathered from such sources to calculate internal credit scoring and credit limits.

15 Claims, 7 Drawing Sheets

(56) References Cited

OTHER PUBLICATIONS

Wustner E et al., "Converting Business Documents: A Classification of Problems and Solutions using XML/XSLT", Advanced issues of E-Commerce and Web-Based Information Systems, 2002. (WECWIS 2002). Proceedings. Fourth IEEE International Workshop on Jun. 26-28, 2002, Piscataway, NJ USA, IEEE, Jun. 26, 2002, pp. 54-61, XP010595208 ISBN: 978-0-7695-1567-0.

European Office Action; Application No. 04 707 216.0-1238, Dec. 14, 2009.

* cited by examiner

CREDIT MANAGEMENT SYSTEM AND METHOD

This application claims the benefit of U.S. Provisional Application No. 60/444,310, filed on Jan. 31, 2003, the content of which is incorporated herein by reference.

FIELD OF THE INVENTION

This invention relates to automated credit management systems and methods for managing credit information relating to a customer. The present invention is particularly useful in industries, such as the telecommunications service industry, where customers are offered services or products on credit.

BACKGROUND OF THE INVENTION

Many businesses that sell goods and/or services sell such goods and/or services on credit. One such business would be a telecommunications service provider. When offering credit, it is a good business practice to determine the risk associated with offering that credit and balance it against the potential profit from the sale for which the credit was offered. This balancing process is often used to generate a credit limit for a particular customer. This process can be an involved and time-consuming process and tends to slow down the conduct of business.

Generally, in most large companies the information needed for credit decisions is spread out all over the company. The necessary communications between various departments within a company, such as the sales, credit and finance departments, can be very time consuming. For instance, the sales, credit and finance departments may need to collaborate on what is the risk associated with offering credit, what is the potential profit, and whether or not accepting the deal is worth the risk. Outside services, like Dunn & Bradstreet, may also help to some extent at determining the risk by offering outside credit scoring. However, such services do not completely address the problem, as each company has its own view of a risk/benefit analysis.

The process of credit management typically consists of interactions between the credit department, the sales department, the finance department and one or more credit information providers. Typically, when a new sales order or service contract is prepared, the sales department and credit department need to interact. The credit department can then check the credit limit of the customer. If the customer credit limit has not been established internally, the contract can be blocked which involves communication with the sales department. Then the customer credit fact sheet is checked in the credit department. The credit department can then interact with the outside credit information provider to get external credit information, such as a credit scoring. This credit scoring can then be used along with other information to establish an internal credit scoring of the customer and, based on this, a credit limit. The sales order can than be released back to the sales department for execution.

Embodiments consistent with the present invention relate to automated credit management systems and methods for managing credit information in an automated fashion. Automated credit management systems consistent with the present invention may include a credit information manager, a credit limit manager, credit decision support and a credit rules engine.

Automating the credit decision can help companies and other entities speed up the credit process and improve the consistency and efficiency of a credit operation. However, such an automated process must be flexible enough to meet the demands of different businesses.

Thus, a need exists for an automated credit management system that is flexible enough to meet the changing needs of different businesses.

It is accordingly an object of the present invention to automate and manage the credit process.

In one embodiment, this is achieved by communicating with external credit information provider systems, gathering information, and applying rules to the information in order to calculate and manage the credit information.

SUMMARY OF THE INVENTION

Embodiments consistent with the present invention relate to automated credit management systems and methods for managing credit information in an automated fashion. Automated credit management systems consistent with the present invention may include a credit information manager, a credit limit manager, credit decision support and a credit rules engine.

Embodiments of the present invention have many advantages over the prior art. For example, they may provide automated validation of a customer's ability to pay before a sale is made. Further, they may enable variable credit limit monitoring of a customer across all company branches and sales channels. Additionally, they may permit a business to analyze and classify customers according to their credit worthiness. They may also provide a flexible tool for calculating a customer's credit rating according to internal rating regulations. Moreover, they may enables a company to use customer data to manage the customers' credit lines according to the company's credit policy. They may also automate the decision process for credit applications. Embodiments of the invention can also support credit managers handling exceptions in the credit management process.

Embodiments of the present invention enable controlling of credit risk via real-time credit allocation and ongoing monitoring. They may permit online credit rating check for a fast credit decision. Further, the may reduce effective DSO by reducing payment delays and bad debt. Additionally, they can increase revenues with risk free accounts by decreasing the rate of credit refusals. They may also reduce transaction costs by automating the credit application process. Moreover, they may improve customer relationships by concentrating the service on profitable customers. Embodiments of the invention may also link dunning and dispute information to the credit decision process.

An embodiment of the present invention provides a system and method for automating and managing the credit process.

Another embodiment of the present invention provides a system and method for determining a credit limit for a customer based upon information relating to the customer through the application of a rule.

Another embodiment of the present invention provides a system and method for performing automated credit scoring updates.

Another embodiment of the present invention provides a system and method for performing credit limit monitoring.

Another embodiment of the present invention provides a system and method for performing credit exposure monitoring.

Another embodiment of the present invention provides a system and method for preparing periodic credit checklists.

Accordingly, it is an object of the present invention to provide for the automatic management of the credit process.

It is another object of the present invention to automatically set a customer credit limit based upon information relating to the customer through the application of a rule.

It is another object of the present invention to automatically update credit scoring.

It is another object of the present invention to monitor credit limits.

It is another object of the present invention to monitor credit exposure.

It is yet another object of the present invention to periodically prepare credit checklists.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Embodiments consistent with the present invention will be better understood by reference to the accompanying drawings and the description herein.

Figure 1:
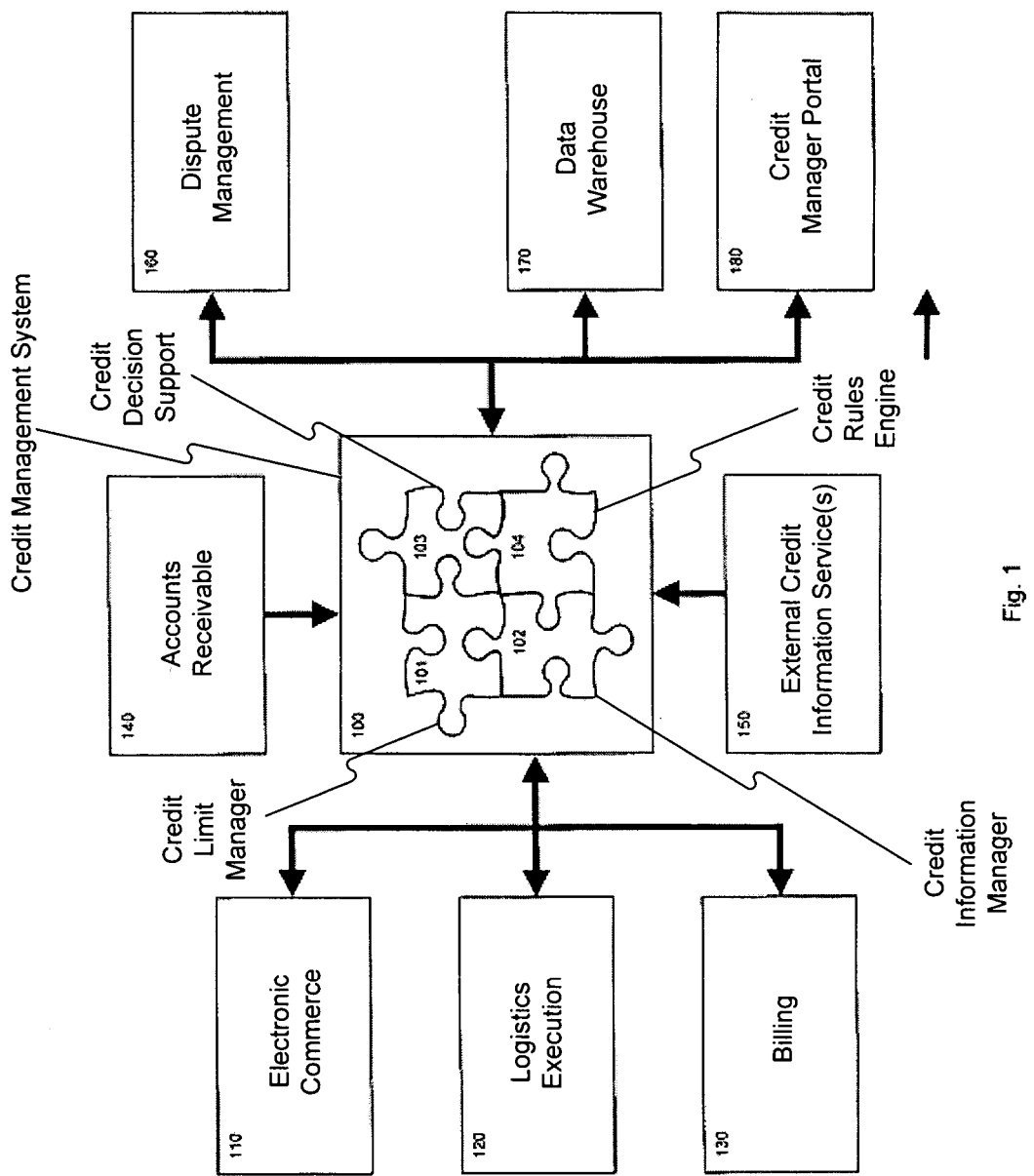
FIG. 1 is a block diagram depicting an automated credit management system according to an embodiment of the present invention.

Referring now to FIG. 1, an exemplary credit management system 100 is shown. Credit management system 100 may contain several functionalities. One is credit limit manager 101. Credit limit manager 101 may handle the credit limit master data, integration with business partners, the calculation of open and used credit lines, the online/offline credit limit check, credit limit hierarchies and/or consolidation of open items from different accounting systems.

Credit information manager 102 is also contained in credit management system 100. Manager 102 may interface and communicate with third party credit information providers, such as Dunn & Bradstreet and other credit bureaus. Credit information manager 102 may collect credit data by analyzing internal customer data, obtain customer data from business partners, monitor credit data validity, and automatically update credit data.

Credit decision support 103 may also be contained in credit management system 100. Support 103 handles customer fact sheets with all credit-relevant customer data and key figures. By way of example, credit decision support 103 may perform credit history analyses, payment history analyses, analyses of customer balance and sales figures for goods and/or services, and DSO analyses. Credit decision support 103 may also handle credit limit warnings and the release of blocked orders.

As further illustrated in FIG. 1, credit rules engine 104 is also part of credit management system 100. Engine 104 dynamically generates credit limits through the application of credit rules. The credit limits can be derived from a customer profile and/or accounting and credit information. In one embodiment, credit rules engine 104 is key to the workflow-supported credit approval process and automatic credit decisions using predefined credit rules that may be set-up by or for the company using credit management system 100 according to their own view of a risk/benefit analysis. Such decisions could include, e.g., accept, reject, blacklist, VIP customer, etc. Engine 104 also may automatically dispatch credit applications to the responsible credit manager.

As illustrated in the embodiment of FIG. 1, an electronic commerce system 110, logistics execution 120, billing system 130, and accounts receivable system 140 all may communicate with credit management system 100. External credit information service(s) 150 can be accessed by credit management system 100 to obtain credit information on customers. Further, credit management system 100 may communicate with dispute management functionality 160 for dealing with disputes regarding credit. System 100 may also communicates with a data warehouse 170 for storing and retrieving information.

Credit management system 100 may communicate with credit manager portal 180 for permitting a user to access the credit management system 100. A user may view credit exposure by country, a list of customers with usage of their credit limit, an overview of all blocked orders, cross-system credit information, general customer and contact data, customer credit information, and/or customer credit history, for example.

In accordance with an embodiment, credit management system 100 is a global credit management solution that can be integrated into all sales, logistics and accounting systems existing at a company. It is particularly useful for a telecommunications service provider because a large portion of its sales of services are conducted on a credit basis. Credit management system 100 can also perform a myriad of functions. For example, it can perform dynamic credit application scoring for new customers and behavior scoring for existing customers. It can perform a workflow based credit approval process. It can perform an online credit rating check using internal company and external credit information. It also can perform ongoing credit risk monitoring in a variety of ways, such as by customer, by currency, or by country. Moreover, it may provide an access point to external credit information available for other accounting systems. It also can provide credit decision support from customer analysis tools including balance analysis, payment history analysis, due date structure, and sales history.

Figure 2:
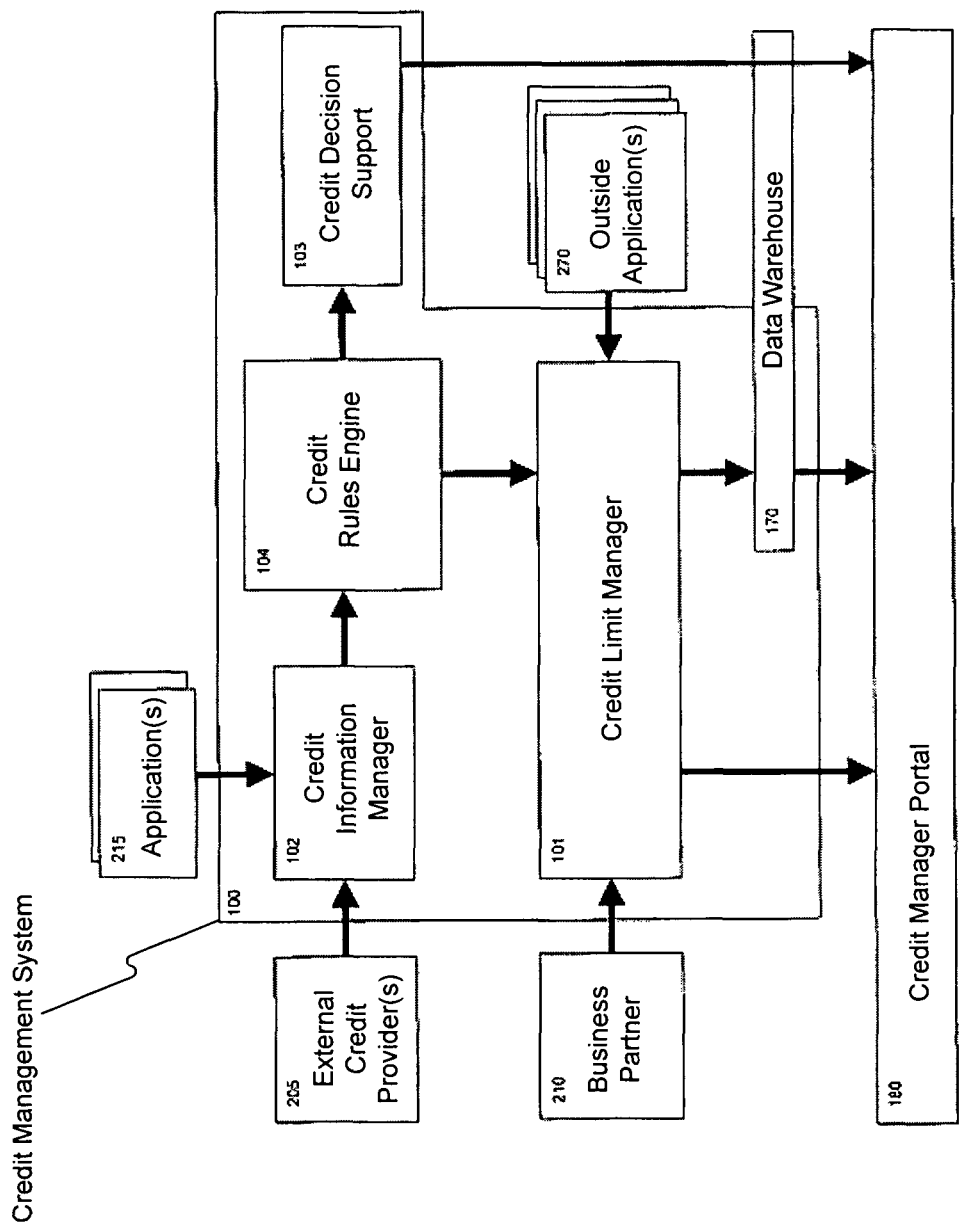
FIG. 2 is a block diagram depicting a process flow in an automatic credit management system according to an embodiment of the present invention.

Referring now to FIG. 2, an exemplary process flow of a credit check using the credit management system 100 according to an embodiment of the present invention is shown. Credit information manager 102 obtains information from external credit information provider(s) 205. It may also gather information from one or more applications 215, such as a dispute application to be used when making a credit determination. Credit information manager 102 provides the appropriate information to credit rules engine 104. The credit rules engine 104 may calculate internal scoring and credit limit and provide this scoring and limit to credit limit manager 101. Credit decision support 103 provides output to credit management portal 180 through data warehouse 170.

A business partner 210 may provide information to or receive information from credit limit manager 101. Credit limit manager 101 may provide information to credit management portal 180, directly and/or through data warehouse 170. It also may accept information from one or more outside applications 270, such as an electronic commerce system or an accounting system, for a request for a credit check or the like.

One of the ways in which the present invention can be used is to perform a credit check for a new customer. Referring to FIGS. 1 and 2, an exemplary process flow of the functioning of credit rules engine 104 during a credit check will be explained. The first step is to take customer information, such as name, ID number (such as a tax ID, social security number, driver's license number, etc.), address, bank account number, age, profession, etc., from an electronic commerce system 110 or another system and forward it to credit management system 100. Credit management system 100 can group and treat the customer according to the group they belong to. For example, it can group the customer as an individual or a company. Different credit rules can be used for each group if desired and external scoring can be obtained from different and/or multiple external credit information sources if desired. A request for credit scoring for a customer is then sent to the appropriate external credit information source(s) 205. A score (s) is then received back. The score(s) can then be stored by credit information manager 102. An internal credit scoring rule can then be applied based on the process group to determine internal scoring by credit rules engine 104. The score can be stored by credit information manager 102. A credit limit can be calculated based on the internal scoring, customer type and/or any other inputs desired by credit rules engine 104 and stored by credit information manager 102. This limit can be used by a telecommunications service provider, for example, to control customer access to telecommunications services. A telecommunications service provider may utilize a customer's credit limit to suspend service once the limit is hit.

Figure 3:
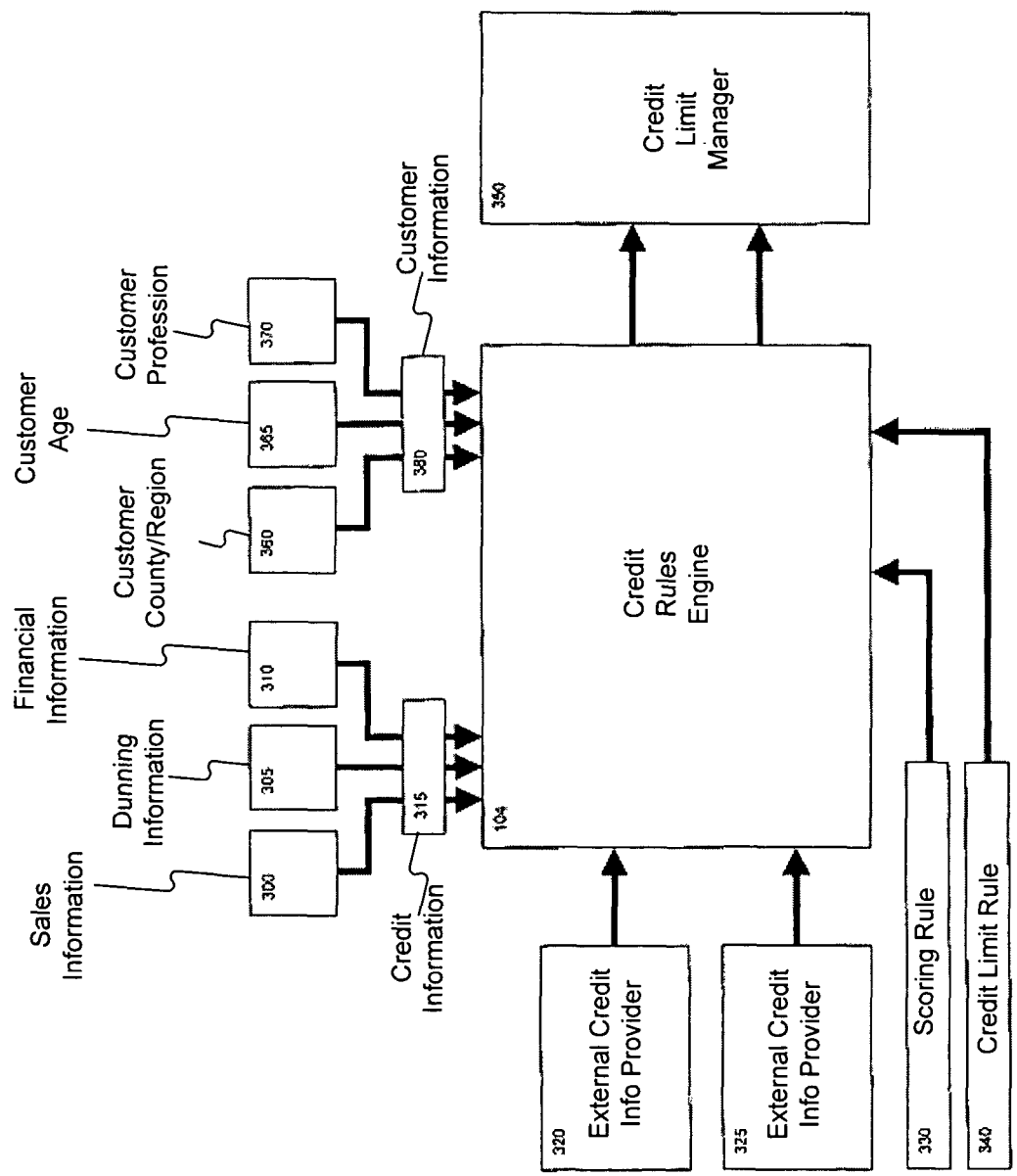
FIG. 3 is a block diagram depicting a process flow for a credit check in an automatic credit management system according to an embodiment of the present invention.

Referring now to FIG. 3, information relating to the volume of sales of goods and/or services 300, dunning information 305, and/or financial information 310 such as average delay in payments, can be used to form credit information 315. This credit information 315 is then provided to credit rules engine 104. For a new customer, such information may not be available unless it is provided by a business partner 210 that has conducted business with the customer in the past. Other information can be used in addition to, or in lieu of, credit information 315. For instance, customer country or region 360, customer age 365, and customer profession 370 can be used to form customer information 380. Credit scoring information from external credit information providers 320 and 325 can also be input to credit rules engine 104. Scoring rule 330 is provided to credit rules engine 104, as is credit limit rule 340. Credit rules engine 104 then applies credit scoring rule 330 and credit limit rule 340 to the credit information 315 and/or customer information 380 and credit scoring information from external service providers 320 and 325. The resulting internal scoring and credit limit are then passed onto credit limit manager 350.

For example, two external credit information providers could be accessed to determine two different external scores A and B. Sales volume, dunning and payment information could be used in a formulaic way by credit rules engine 104 to obtain a score C. Region, age and profession could be used to obtain a score D. Credit rules engine 104 can then calculate an internal scoring S through the application of a credit rule. For example, IF (blacklist entry exists) S=0, ELSE S=(2*A+3*B+5*C+5*D)/15.

Figure 4:
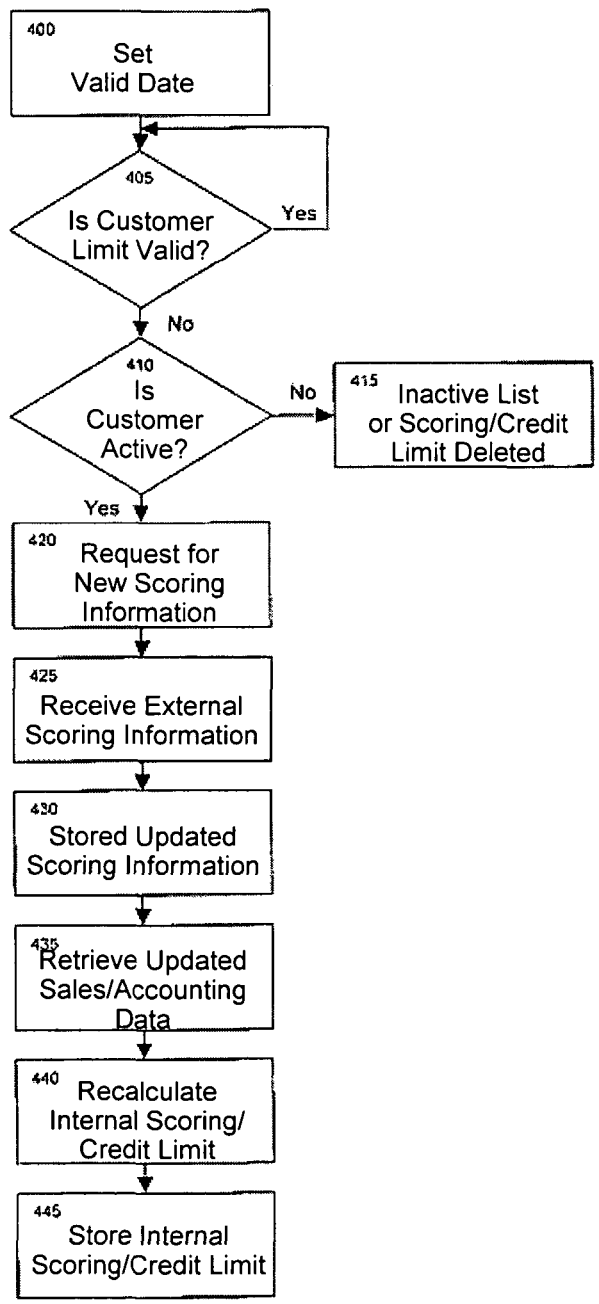
FIG. 4 is a flow chart depicting a method of a periodic credit scoring update according to an embodiment of the present invention.

Periodic updating of internal customer scoring and/or credit limit can be done. This updating may be especially useful to telecommunications service providers. Referring now to FIG. 4, an embodiment of this process is described. This update can operate either in a pull or a push fashion. With the pull method, the process is initiated by credit management 100. This can be done periodically or on demand. If it is to be performed periodically, a valid date can be set in step 400. This date is an indication of when the validity of the current internal credit scoring and credit limit either expire or the last date they are valid. In step 405, a periodic batch job can be run to find customers whose limits are no longer valid. For a customer whose information is no longer valid, it can be determined if the customer is active, in step 410. This step is not a necessary step but may be desired to avoid additional requests for credit updates in the future during other periodic updates. If the customer is not active, in step 415, he/she may be placed on an inactive list or his/her scoring and credit limit may be deleted so that a new request for scoring will have to be performed upon receiving a new order from the inactive customer. If the customer is active, a request to external sources can be made for new scoring information in step 420. External credit information sources then provide external scoring to credit management 100 in step 425. This information is stored in step 430 to update the stored external scoring. In step 435, credit management 100 retrieves updated sales and accounting data. In step 440, the internal scoring and/or credit limit is then recalculated based upon the new external credit scoring and the data obtained in step 435. In step 445, the internal scoring and/or internal credit limit is then stored. A process for push updating is essentially the same, but may begin at step 425.

Figure 5:
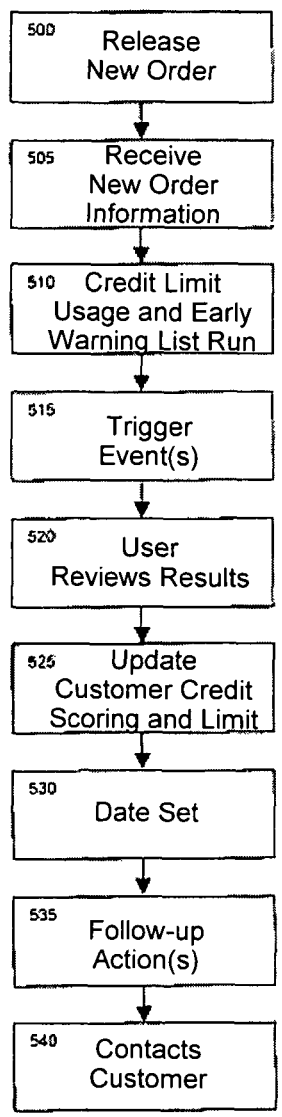
FIG. 5 is a flow chart depicting a method of a credit limit monitoring according to an embodiment of the present invention.

Referring now to FIG. 5, an exemplary process of credit limit monitoring is shown. This process begins in step 500, when a new order or contract is released for a customer by an electronic commerce system, for example, or in the telecommunications industry, when a service is being accessed, such as when a new call is being placed. In step 505, information relating to new orders from an electronic commerce system, unbilled and billed but not posted items or usage from a billing system, and open items from an accounts receivable system, for example, is received by credit management system 100. In step 510, a credit limit usage and early warning list is run periodically to determine those customers above, at, or near their credit limits. In step 515, an event is triggered for follow-up. In step 520, the results can be reviewed in the credit manager portal by a user. In step 525, the customer credit scoring and limit can be updated. This may be accomplished through the method discussed earlier with respect to the exemplary pull method of FIG. 4. In step 530, a date can be set for the validity of the new credit scoring and limit to expire. In step 535, workflow proceeds for follow-up actions. In step 540, the customer can be contacted if desired.

Figure 6:
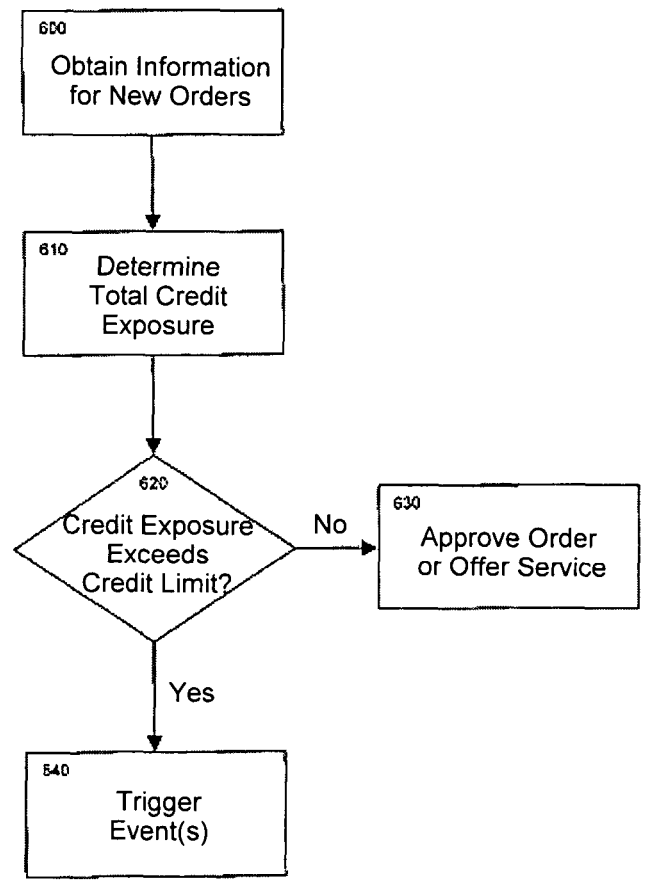
FIG. 6 is a flow chart depicting a method of credit exposure monitoring according to an embodiment of the present invention.

Referring to FIG. 6, an exemplary process of periodic exposure monitoring can be performed. This process first entails obtaining information relating to new orders from an electronic commerce system, or in the telecommunications industry, when a service is being accessed, such as when a new call being placed, unbilled and billed but not posted items or usage from a billing system, and open items from an accounts receivable system, for example, in step 600. In step 610, the totals of the new order, the unbilled and billed but not posted amount and the open items are added together to determine a total credit exposure. In step 620, this credit exposure is compared with the credit limit to determine if the credit exposure exceeds the credit limit and if so, to what extent. If the credit exposure does not exceed the credit limit, the order can be approved or the service can be offered in step 630. If the credit exposure does exceed the credit limit, in step 640, an event(s) can be triggered. For example, the total credit exposure, the amount of the exposure over the credit limit, and/or the fact that the exposure exceeds the credit limit can be sent to a report or program, used to reject an order or suspend a service (such as disabling calls) and/or to request down payment or cash from the affected customer.

Figure 7:
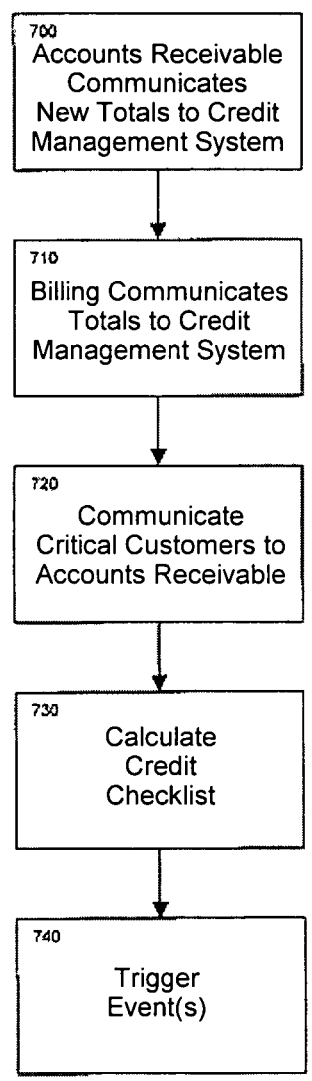
FIG. 7 is a flow chart depicting a method of creating a periodic credit checklist according to an embodiment of the present invention.

Referring to FIG. 7, an exemplary process is shown for generating a periodic credit checklist. This process could also be initiated on demand. In step 700, accounts receivable system 140 communicates its new totals to credit management system 100. In step 710, billing system 130 communicates its totals to credit management system 100. In step 720, a list of critical customers may be communicated back to accounts receivable system 140, for example, by credit management system 100. In step 730, a credit checklist can be calculated, for example, by taking a predetermined percentage of the customers reported by accounts receivable system 140, any suspicious customers and any critical customers along with a predetermined percentage of the customers reported by billing system 130, and any critical customers. From this information, a report can be created in step 740 with the information for review by a credit department employee through credit management portal 180 or some other event can be triggered.

Credit events can include credit limit exceeded, credit master data changed, scoring changed, credit limit changed, and external rating changed. Follow-up activities based upon credit events include triggering internal workflows and triggering external applications. The internal workflows can include calling the customer or requesting a down payment or cash. The external workflows can include locking the customer account by preventing further orders or disabling services, disabling the credit, creating a bill, or blacklisting the customer.

Although the embodiments of the present invention have been described and illustrated in detail, it will be evident to those skilled in the art that various modifications and changes may be made thereto without departing from the spirit and scope of the invention as set forth in the appended claims and equivalents thereof. Therefore, it is intended that this disclosure and the illustrated examples be considered as exemplary only, with a true scope and spirit of the invention being indicated by the following claims.

What is claimed is:

1. A computer system for managing information relating to credit of a customer, the computer system comprising:
    a credit information manager component, implemented on a computer, that obtains an external credit score from third party credit information providers, and collects credit data about the customer, wherein collecting credit data includes analyzing internal customer data, obtaining customer data from at least one business partner, monitoring credit data validity, and automatically updating credit data;
    a credit limit manager component, implemented on the computer, which manages credit limit master data by calculating open and used credit for the customer;
    a credit decision support component, implemented on the computer, which performs analyses of accounting information relating to the customer; and
    a credit rules engine, implemented on the computer, which:
        receives the collected credit data from the credit information manager; and
        calculates an internal credit score and internal credit limits by combining:
            the external credit score;
            the credit data received from the credit information manager;
            the credit limit master data:
            the calculated open and used credit; and
            the accounting information related to the customer.

2. A computer system as in claim 1, wherein the accounting information comprises at least one of sales volume information, dunning information, and payment history information.

3. A computer system as in claim 1, wherein the credit rules engine includes customer information input into the credit management system when calculating the internal credit score and the internal credit limits, the customer information comprising customer profession and age information.

4. A computer-implemented method of automatically performing a credit check relating to a customer, comprising the steps of:
    obtaining, by a computer, an external credit score from at least one external credit information provider;
    obtaining, by the computer, calculated open and used credit for the customer;
    obtaining, by the computer, credit data about the customer, wherein obtaining credit data includes analyzing internal customer data, obtaining customer data from at least one business partner, monitoring credit data validity, and automatically updating credit data;
    obtaining, by the computer, accounting information for the customer;
    obtaining, by the computer, credit limit master data;
    calculating, by the computer, an internal credit score and internal credit limits by combining:
        the external credit score;
        the obtained credit data;
        the credit limit master data;
        the calculated open and used credit; and
        the accounting information; and
    storing, by the computer, the internal credit score and the internal credit limits.

5. A method of automatically performing a credit check as in claim 4, wherein the computer calculates the internal credit score prior to calculating the internal credit limits, and the internal credit score is used to calculate the internal credit limits.

6. A method of automatically performing a credit check as in claim 5, further comprising the step of storing the internal credit score.

7. A method of automatically performing a credit check as in claim 4, wherein the accounting information comprises at least one of sales volume information, dunning information, or payment history information.

8. A method of automatically performing a credit check as in claim 4, wherein the computer includes customer personal information when calculating the internal credit score and the internal credit limits, the customer personal information comprising profession and age information.

9. A computer-implemented method of automatically updating a customer's internal credit score, the method comprising the steps of:
- receiving, by a computer, an updated external credit score from at least one external credit information provider;
- storing, by the computer, the updated external credit score;
- collecting, by the computer, credit data about the customer, wherein collecting credit data includes analyzing internal customer data, obtaining customer data from at least one business partner, monitoring credit data validity, and automatically updating credit data;
- calculating, by the computer, open and used credit for the customer;
- receiving, by the computer, credit limit master data;
- storing, by the computer, the calculated open and used credit information;
- retrieving, by the computer, updated accounting information related to the customer;
- performing analyses, by the computer, of accounting information related to the customer;
- calculating, by the computer, the new internal credit score and internal credit limits by combining:
  - the external credit score;
  - the collected credit data received from the credit information manager;
  - the credit limit master data;
  - the calculated open and used credit; and
  - the accounting information relating to the customer; and
- storing, by the computer, the new internal credit score.

10. A method of automatically updating a customer's internal credit score as in claim 9, further comprising the step of requesting the updated external credit score from the at least one external credit information provider.

11. A method of automatically updating a customer's internal credit score as in claim 9, further comprising the steps of:
- determining if the internal credit score is still valid;
- determining if the customer is active; and
- if the customer is not active, adding the customer to an inactive list and not updating the customer's internal credit score.

12. A method of automatically updating a customer's internal credit score as in claim 11, wherein if the customer is not active, erasing a stored credit limit and credit score for the customer.

13. A computer-readable medium storing instructions, which when executed by a processor, cause the processor to perform a method, the method comprising:
- obtaining, using the processor, an external credit score from at least one external credit information provider;
- obtaining, using the processor, information relating to calculated open and used credit for a customer;
- obtaining, using the processor, accounting information for the customer;
- obtaining, using the processor, credit limit master data;
- obtaining, using the processor, credit data about the customer, wherein obtaining credit data includes analyzing internal customer data, obtaining customer data from at least one business partner, monitoring credit data validity, and automatically updating credit data;
- calculating, using the processor, an internal credit score and internal credit limits by combining the external credit score, the obtained credit data, the credit limit master data, the calculated open and used credit, and the accounting information related to the customer; and
- storing, using the processor, the internal credit score and the internal credit limits.

14. The computer-readable medium of claim 13, wherein the accounting information comprises at least one of sales volume information, dunning information, and payment history information.

15. The computer-readable medium of claim 13, wherein the processor includes customer personal information input into the credit management system when calculating the internal credit score and the internal credit limits, the customer personal information comprising customer profession and age information.

* * * * *